(12) United States Patent  
Kim et al.

(10) Patent No.: US 10,474,163 B2  
(45) Date of Patent: Nov. 12, 2019

(54) VEHICLE CONTROL DEVICE MOUNTED ON VEHICLE AND METHOD FOR CONTROLLING THE VEHICLE

(71) Applicant: LG ELECTRONICS INC., Seoul (KR)

(72) Inventors: Sungmin Kim, Seoul (KR); Jinsang Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 66 days.

(21) Appl. No.: 15/710,002

(22) Filed: Sep. 20, 2017

(65) Prior Publication Data

US 2018/0143648 A1 May 24, 2018

Related U.S. Application Data

(60) Provisional application No. 62/426,309, filed on Nov. 24, 2016.

(30) Foreign Application Priority Data

May 8, 2017 (KR) .................. 10-2017-0057554

(51) Int. Cl.
*G05D 1/02* (2006.01)
*G05D 1/00* (2006.01)
(Continued)

(52) U.S. Cl.
CPC ........... *G05D 1/0274* (2013.01); *B60W 30/09* (2013.01); *B60W 50/00* (2013.01);
(Continued)

(58) Field of Classification Search
CPC .. G05D 1/0274; G05D 1/0278; G05D 1/0088; G05D 2201/0213; B60W 50/00;
(Continued)

(56) References Cited

U.S. PATENT DOCUMENTS

2007/0078584 A1 4/2007 Nakamura
2007/0106458 A1 5/2007 Iwami
(Continued)

FOREIGN PATENT DOCUMENTS

KR 2013129931 A 11/2013

OTHER PUBLICATIONS

International Search Report and Written Opinion in International Application No. PCT/KR2017/010398, dated Jan. 30, 2018, 14 pages.

*Primary Examiner* — Brian P Sweeney
(74) *Attorney, Agent, or Firm* — Fish & Richardson P.C.

(57) ABSTRACT

The present disclosure relates to a vehicle control device provided in a vehicle and a method for controlling the vehicle. A vehicle control device provided in a vehicle according to the present disclosure, as a vehicle control device for controlling the vehicle, may include a communication unit configured to receive a map having a plurality of layers from a server; and a processor configured to generate a control signal for driving the vehicle using the map, wherein a control region that is a reference for the generation of the control signal around a location of the vehicle is defined differently according to a preset reference.

20 Claims, 14 Drawing Sheets

(51) Int. Cl.
*B60W 50/10* (2012.01)
*B60W 50/00* (2006.01)
*B60W 50/08* (2012.01)
*B60W 30/09* (2012.01)

(52) U.S. Cl.
CPC .......... *B60W 50/082* (2013.01); *B60W 50/10* (2013.01); *G05D 1/0088* (2013.01); *G05D 1/0278* (2013.01); *B60W 2550/40* (2013.01); *B60W 2550/402* (2013.01); *B60W 2550/404* (2013.01); *G05D 2201/0213* (2013.01)

(58) Field of Classification Search
CPC .... B60W 50/082; B60W 30/09; B60W 50/10; B60W 2550/40; B60W 2550/402; B60W 2550/404
USPC .......................................................... 701/25
See application file for complete search history.

(56) References Cited

U.S. PATENT DOCUMENTS

2010/0256852 A1\* 10/2010 Mudalige ............... G08G 1/163
 701/24
2014/0088855 A1\* 3/2014 Ferguson ............... G08G 1/166
 701/117
2014/0288816 A1 9/2014 Hayasaka \* cited by examiner

VEHICLE CONTROL DEVICE MOUNTED ON VEHICLE AND METHOD FOR CONTROLLING THE VEHICLE

CROSS-REFERENCE TO RELATED APPLICATION

Pursuant to 35 U.S.C. § 119(a), this application claims the benefit of an earlier filing date of and the right of priority to Korean Application No. 10-2017-0057554, filed on May 8, 2017, and U.S. Provisional Patent Application No. 62/426,309 filed on Nov. 24, 2016, the contents of which are incorporated by reference herein in its entirety.

BACKGROUND OF THE INVENTION

1. Field of the Invention

The present disclosure relates to a vehicle control device provided in a vehicle and a method for controlling the vehicle.

2. Background of the Invention

A vehicle is an apparatus capable of moving a user in his or her desired direction, and a representative example may be a car.

Meanwhile, for convenience of a user using a vehicle, various types of sensors and electronic devices are provided in the vehicle. Specifically, a study on an Advanced Driver Assistance System (ADAS) is actively undergoing. In addition, an autonomous vehicle is actively under development.

As the development of the advanced driving assist system (ADAS) is actively undergoing in recent time as described above, development of a technology for optimizing user's convenience and safety while driving a vehicle is required.

As part of this effort, in order to effectively transmit eHorizon (electronic Horizon) data to autonomous navigation systems and infotainment systems, the EU OEM (European Union Original Equipment Manufacturing) Association has established a data specification and transmission method as a standard under the name "ADASIS (ADAS (Advanced Driver Assist System) Interface Specification)."

In addition, eHorizon (software) is becoming an integral part of the safety/ECO/convenience of autonomous vehicles in a connected environment.

According to telematics communication in the related art, the location information of a vehicle may be transmitted to an external server through cellular communication. At this time, there exists a difficulty in receiving map information using cellular communication due to a narrow bandwidth for the vehicle.

According to V2X communication in the related art, the location information of an external vehicle may be received and compared with the location of the own vehicle. However, DSRC has a problem that an inter-vehicle communication sensitivity is degraded in a place where the signal is weak, and update in seconds is impossible.

SUMMARY OF THE INVENTION

An object of the present disclosure is to solve the foregoing problems and other problems. Another object of the present disclosure is to provide a vehicle control device capable of defining a control region based on various references, and using data related to the control region for the generation of a control signal, and a method for controlling the vehicle.

In order to accomplish the foregoing or other objects, according to an aspect of the present disclosure, as a vehicle control device for controlling a vehicle having a sensing unit, there is provided a vehicle control device including a communication unit configured to receive a map having a plurality of layers from a server; and a processor configured to generate a control signal for driving the vehicle using the map, wherein a control region that is a reference for the generation of the control signal around a location of the vehicle is defined differently according to a preset reference.

According to an embodiment, data related to the control region may be used to generate the control signal, and data not related to the control region may not be used to generate the control signal.

According to another embodiment, the control region may be defined based on at least one of a traffic of data communication amount for the control of the vehicle, speed information of the vehicle, road information on which the vehicle is driving, and a driving direction of the vehicle.

According to still another embodiment, the control region may be defined as a different area according to a traffic of data communication amount for the control of the vehicle.

According to yet still another embodiment, the control region may be defined as a different shape and area according to a speed of the vehicle.

According to still yet another embodiment, the control region may be defined differently according to a type of road on which the vehicle is driving.

According to yet still another embodiment, the control region may be defined to exclude a region corresponding to a road in a driving direction opposite to that of the vehicle based on the vehicle driving on a preset type of road.

According to still yet another embodiment, the control region may be defined to exclude a region in which a possibility of collision with another vehicle is less than a preset reference based on the driving direction of the vehicle.

According to yet still another embodiment, the control region may be defined as at least one of a plurality of candidate regions.

Here, the priorities of the plurality of candidate regions may be defined based on a preset reference.

According to still yet another embodiment, the control region may be defined as a region including a driving route of the vehicle among the plurality of candidate regions.

According to yet still another embodiment, the processor may control the plurality of candidate regions in different ways according to the priorities.

According to still yet another embodiment, the processor may receive map information corresponding to a control region chosen according to the priorities among the plurality of candidate regions through the communication unit, and then control the autonomous driving of the vehicle based on the map information.

According to yet still another embodiment, the processor may receive map information corresponding to the control region through the communication unit, and control the autonomous driving of the vehicle based on the map information.

According to still yet another embodiment, the processor may produce a plurality of events from the data of the vicinity of the vehicle received through the communication unit, and exclude redundant events from the plurality of events based on the map information.

According to yet still another embodiment, the processor may control the autonomous driving of the vehicle based on an event excluding the redundant events.

According to still yet another embodiment, the processor may receive map information corresponding to a control region redefined as a region corresponding to an event excluding the redundant events through the communication unit, and then control the autonomous driving of the vehicle based on the map information.

In addition, according to another aspect of the present disclosure, as a method of controlling a vehicle having a sensing unit, and there is provided a control method of the vehicle including (a) receiving a map having a plurality of layers from a server; and (b) generating a control signal for driving the vehicle using the map, wherein a control region that is a reference for the generation of the control signal around a location of the vehicle is defined differently according to a preset reference.

According to an embodiment, the step (b) may include using data related to the control region to generate the control signal, and not using data not related to the control region to generate the control signal.

According to another embodiment, the control region may be defined based on at least one of a traffic of data communication amount for the control of the vehicle, speed information of the vehicle, road information on which the vehicle is driving, and a driving direction of the vehicle.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF THE INVENTION

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

A vehicle according to an embodiment of the present disclosure may be understood as a conception including cars, motorcycles and the like. Hereinafter, the vehicle will be described based on a car.

The vehicle according to the embodiment of the present disclosure may be a conception including all of an internal combustion engine car having an engine as a power source, a hybrid vehicle having an engine and an electric motor as power sources, an electric vehicle having an electric motor as a power source, and the like.

In the following description, a left side of a vehicle refers to a left side in a driving direction of the vehicle, and a right side of the vehicle refers to a right side in the driving direction.

Figure 1:
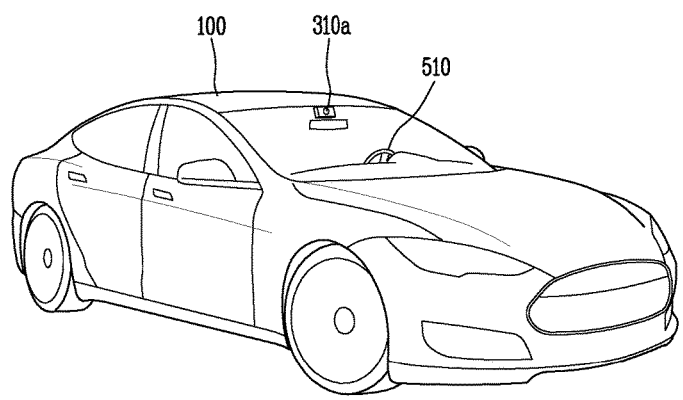
FIG. 1 is a view illustrating an appearance of a vehicle according to an embodiment of the present disclosure.
Figure 1:
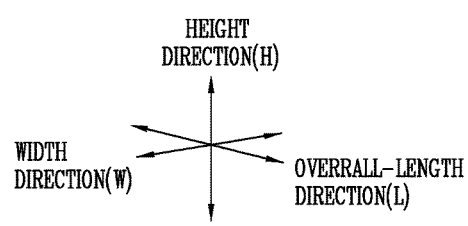

FIG. 1 is a view illustrating appearance of a vehicle in accordance with an embodiment of the present disclosure.

Figure 2:
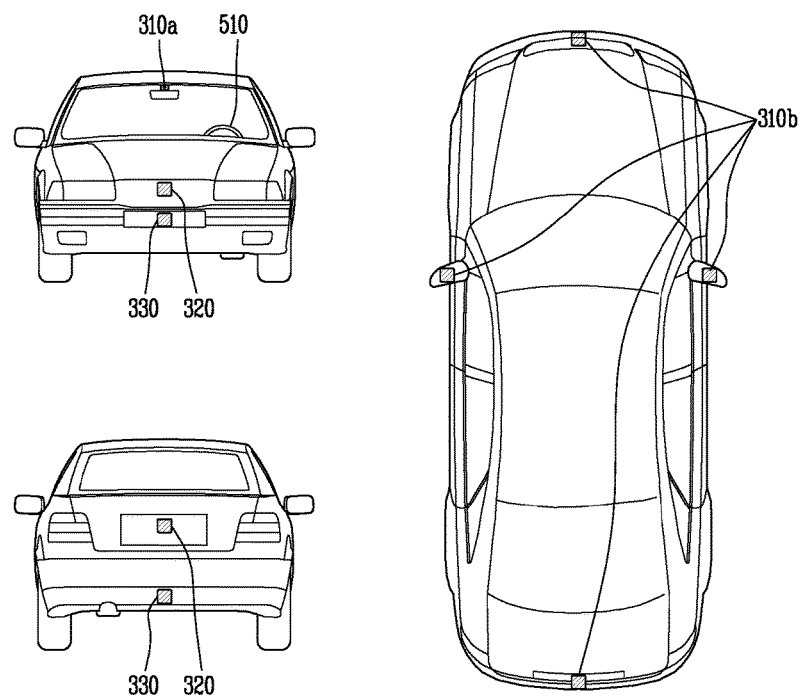
FIG. 2 is a view in which a vehicle according to an embodiment of the present disclosure is seen from various angles.

FIG. 2 is a view illustrating appearance of a vehicle at various angles in accordance with an embodiment of the present disclosure.

Figure 3:
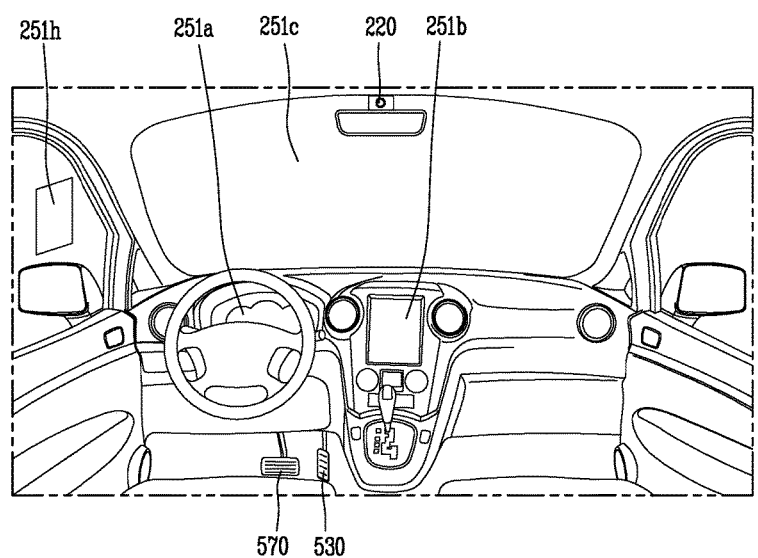
FIGS. 3 and 4 are views illustrating an inside of a vehicle according to an embodiment of the present disclosure.
Figure 4:
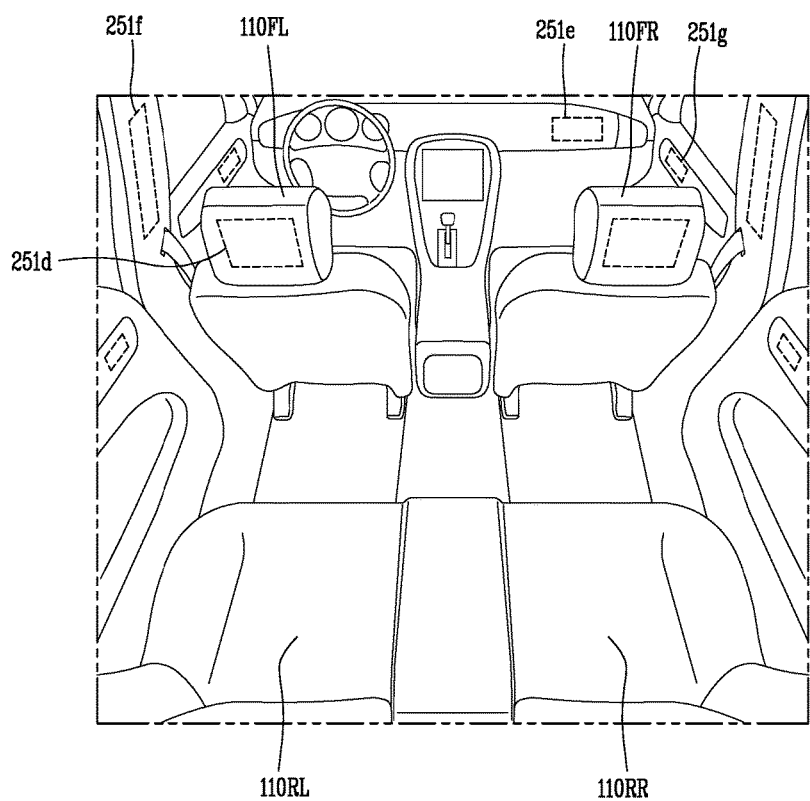

FIGS. 3 and 4 are views illustrating an inside of a vehicle in accordance with an embodiment of the present disclosure.

Figure 5:
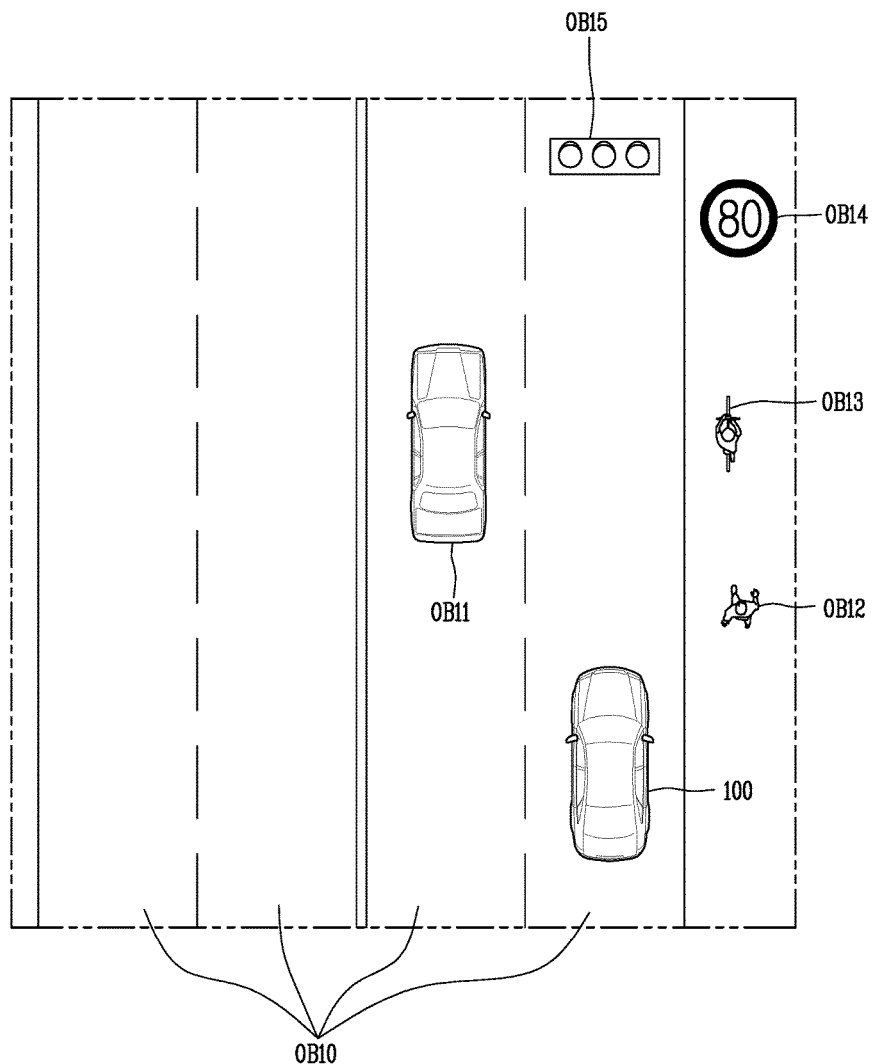
FIGS. 5 and 6 are views referred to explain an object according to an embodiment of the present disclosure.
Figure 6:
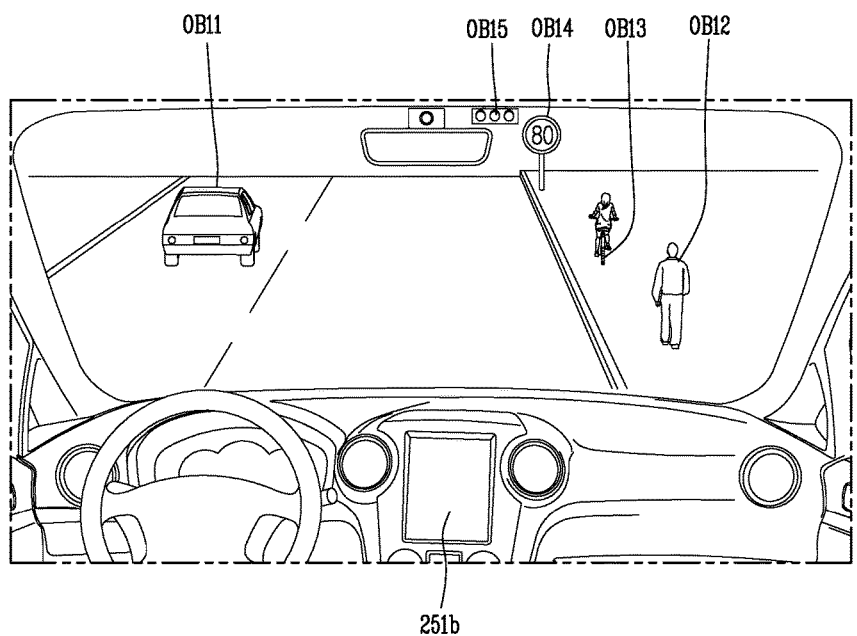

FIGS. 5 and 6 are reference views illustrating objects in accordance with an embodiment of the present disclosure.

Figure 7:
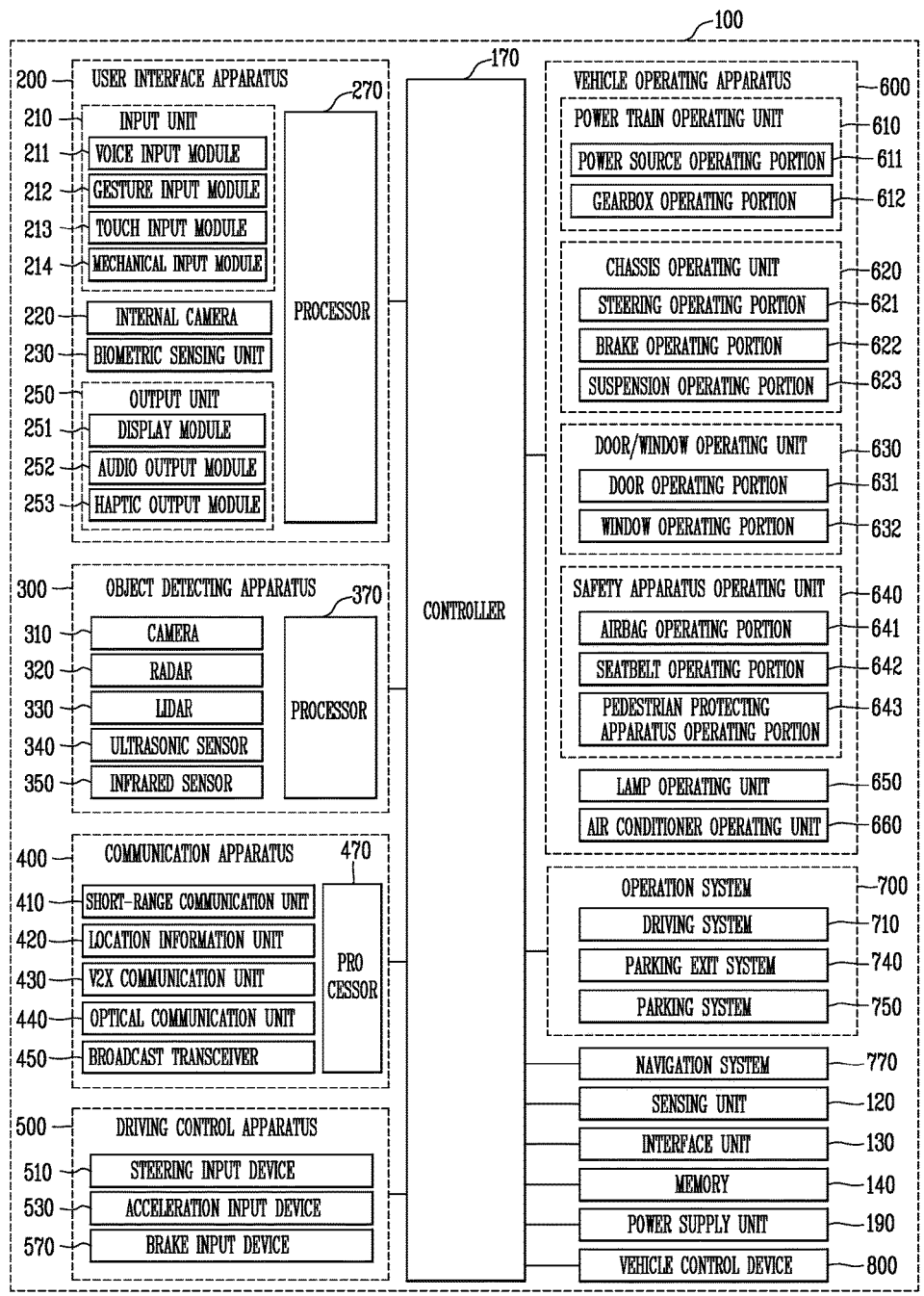
FIG. 7 is a block diagram for explaining a vehicle according to an embodiment of the present disclosure.

FIG. 7 is a block diagram illustrating a vehicle in accordance with an embodiment of the present disclosure As illustrated in FIG. 1 through 7, a vehicle 100 may include wheels turning by a driving force, and a steering apparatus 510 for adjusting a driving (ongoing, moving) direction of the vehicle 100.

The vehicle 100 may be an autonomous vehicle.

The vehicle 100 may be switched into an autonomous mode or a manual mode based on a user input.

For example, the vehicle may be converted from the manual mode into the autonomous mode or from the autonomous mode into the manual mode based on a user input received through a user interface apparatus 200.

The vehicle 100 may be switched into the autonomous mode or the manual mode based on driving environment information. The driving environment information may be generated based on object information provided from an object detecting apparatus 300.

For example, the vehicle 100 may be switched from the manual mode into the autonomous mode or from the autonomous module into the manual mode based on driving environment information generated in the object detecting apparatus 300.

In an example, the vehicle 100 may be switched from the manual mode into the autonomous mode or from the autonomous module into the manual mode based on driving environment information received through a communication apparatus 400.

The vehicle 100 may be switched from the manual mode into the autonomous mode or from the autonomous module into the manual mode based on information, data or signal provided from an external device.

When the vehicle 100 is driven in the autonomous mode, the autonomous vehicle 100 may be driven based on an operation system 700.

For example, the autonomous vehicle 100 may be driven based on information, data or signal generated in a driving system 710, a parking exit system 740 and a parking system 750.

When the vehicle 100 is driven in the manual mode, the autonomous vehicle 100 may receive a user input for driving through a driving control apparatus 500. The vehicle 100 may be driven based on the user input received through the driving control apparatus 500.

An overall length refers to a length from a front end to a rear end of the vehicle 100, a width refers to a width of the vehicle 100, and a height refers to a length from a bottom of a wheel to a roof. In the following description, an overall-length direction L may refer to a direction which is a criterion for measuring the overall length of the vehicle 100, a width direction W may refer to a direction that is a criterion for measuring a width of the vehicle 100, and a height direction H may refer to a direction that is a criterion for measuring a height of the vehicle 100.

As illustrated in FIG. 7, the vehicle 100 may include a user interface apparatus 200, an object detecting apparatus 300, a communication apparatus 400, a driving control apparatus 500, a vehicle operating apparatus 600, a operation system 700, a navigation system 770, a sensing unit 120, an interface unit 130, a memory 140, a controller 170 and a power supply unit 190.

According to embodiments, the vehicle 100 may include more components in addition to components to be explained in this specification or may not include some of those components to be explained in this specification.

The user interface apparatus 200 is an apparatus for communication between the vehicle 100 and a user. The user interface apparatus 200 may receive a user input and provide information generated in the vehicle 100 to the user. The vehicle 200 may implement user interfaces (UIs) or user experiences (UXs) through the user interface apparatus 200.

The user interface apparatus 200 may include an input unit 210, an internal camera 220, a biometric sensing unit 230, an output unit 250 and a processor 270.

According to embodiments, the user interface apparatus 200 may include more components in addition to components to be explained in this specification or may not include some of those components to be explained in this specification.

The input unit 200 may allow the user to input information. Data collected in the input unit 120 may be analyzed by the processor 270 and processed as a user's control command.

The input unit 210 may be disposed within the vehicle. For example, the input unit 200 may be disposed on one area of a steering wheel, one area of an instrument panel, one area of a seat, one area of each pillar, one area of a door, one area of a center console, one area of a headlining, one area of a sun visor, one area of a wind shield, one area of a window or the like.

The input unit 210 may include a voice input module 211, a gesture input module 212, a touch input module 213, and a mechanical input module 214.

The audio input module 211 may convert a user's voice input into an electric signal. The converted electric signal may be provided to the processor 270 or the controller 170.

The voice input module 211 may include at least one microphone.

The gesture input module 212 may convert a user's gesture input into an electric signal. The converted electric signal may be provided to the processor 270 or the controller 170.

The gesture input module 212 may include at least one of an infrared sensor and an image sensor for detecting the user's gesture input.

According to embodiments, the gesture input module 212 may detect a user's three-dimensional (3D) gesture input. To this end, the gesture input module 212 may include a light emitting diode outputting a plurality of infrared rays or a plurality of image sensors.

The gesture input module 212 may detect the user's 3D gesture input by a time of flight (TOF) method, a structured light method or a disparity method.

The touch input module 213 may convert the user's touch input into an electric signal. The converted electric signal may be provided to the processor 270 or the controller 170.

The touch input module 213 may include a touch sensor for detecting the user's touch input.

According to an embodiment, the touch input module 213 may be integrated with the display unit 251 so as to implement a touch screen. The touch screen may provide an input interface and an output interface between the vehicle 100 and the user.

The mechanical input module 214 may include at least one of a button, a dome switch, a jog wheel and a jog switch.

An electric signal generated by the mechanical input module 214 may be provided to the processor 270 or the controller 170.

The mechanical input module 214 may be arranged on a steering wheel, a center fascia, a center console, a cockpit module, a door and the like.

The internal camera 220 may acquire an internal image of the vehicle. The processor 270 may detect a user's state based on the internal image of the vehicle. The processor 270 may acquire information related to the user's gaze from the internal image of the vehicle. The processor 270 may detect a user gesture from the internal image of the vehicle.

The biometric sensing unit 230 may acquire the user's biometric information. The biometric sensing module 230 may include a sensor for detecting the user's biometric information and acquire fingerprint information and heart rate information regarding the user using the sensor. The biometric information may be used for user authentication.

The output unit 250 may generate an output related to a visual, audible or tactile signal.

The output unit 250 may include at least one of a display module 251, an audio output module 252 and a haptic output module 253.

The display module 251 may output graphic objects corresponding to various types of information.

The display module 251 may include at least one of a liquid crystal display (LCD), a thin film transistor-LCD (TFT LCD), an organic light-emitting diode (OLED), a flexible display, a three-dimensional (3D) display and an e-ink display.

The display module 251 may be inter-layered or integrated with a touch input module 213 to implement a touch screen.

The display module 251 may be implemented as a head up display (HUD). When the display module 251 is implemented as the HUD, the display module 251 may be provided with a projecting module so as to output information through an image which is projected on a windshield or a window.

The display module 251 may include a transparent display. The transparent display may be attached to the windshield or the window.

The transparent display may have a predetermined degree of transparency and output a predetermined screen thereon. The transparent display may include at least one of a thin film electroluminescent (TFEL), a transparent OLED, a transparent LCD, a transmissive transparent display and a transparent LED display. The transparent display may have adjustable transparency.

Meanwhile, the user interface apparatus 200 may include a plurality of display modules 251a through 251g.

The display module 251 may be disposed on one area of a steering wheel, one area 521a, 251b, 251e of an instrument panel, one area 251d of a seat, one area 251f of each pillar, one area 251g of a door, one area of a center console, one area of a headlining or one area of a sun visor, or implemented on one area 251c of a windshield or one area 251h of a window.

The audio output module 252 converts an electric signal provided from the processor 270 or the controller 170 into an audio signal for output. To this end, the audio output module 252 may include at least one speaker.

The haptic output module 253 generates a tactile output. For example, the haptic output module 253 may vibrate the steering wheel, a safety belt, a seat 110FL, 110FR, 110RL, 110RR such that the user can recognize such output.

The processor 270 may control an overall operation of each unit of the user interface apparatus 200.

According to an embodiment, the user interface apparatus 200 may include a plurality of processors 270 or may not include any processor 270.

When the processor 270 is not included in the user interface apparatus 200, the user interface apparatus 200 may operate according to a control of a processor of another apparatus within the vehicle 100 or the controller 170.

Meanwhile, the user interface apparatus 200 may be called as a display apparatus for vehicle.

The user interface apparatus 200 may operate according to the control of the controller 170.

The object detecting apparatus 300 is an apparatus for detecting an object located at outside of the vehicle 100.

The object may be a variety of objects associated with driving (operation) of the vehicle 100.

Referring to FIGS. 5 and 6, an object O may include a traffic lane OB10, another vehicle OB11, a pedestrian OB12, a two-wheeled vehicle OB13, traffic signals OB14 and OB15, light, a road, a structure, a speed hump, a geographical feature, an animal and the like.

The lane OB01 may be a driving lane, a lane next to the driving lane or a lane on which another vehicle comes in an opposite direction to the vehicle 100. The lanes OB10 may be a concept including left and right lines forming a lane.

The another vehicle OB11 may be a vehicle which is moving around the vehicle 100. The another vehicle OB11 may be a vehicle located within a predetermined distance from the vehicle 100. For example, the another vehicle OB11 may be a vehicle which moves before or after the vehicle 100.

The pedestrian OB12 may be a person located near the vehicle 100. The pedestrian OB12 may be a person located within a predetermined distance from the vehicle 100. For example, the pedestrian OB12 may be a person located on a sidewalk or roadway.

The two-wheeled vehicle OB13 may refer to a vehicle (transportation facility) that is located near the vehicle 100 and moves using two wheels. The two-wheeled vehicle OB13 may be a vehicle that is located within a predetermined distance from the vehicle 100 and has two wheels. For example, the two-wheeled vehicle OB13 may be a motorcycle or a bicycle that is located on a sidewalk or roadway.

The traffic signals may include a traffic light OB15, a traffic sign OB14 and a pattern or text drawn on a road surface.

The light may be light emitted from a lamp provided on another vehicle. The light may be light generated from a streetlamp. The light may be solar light.

The road may include a road surface, a curve, an upward slope, a downward slope and the like.

The structure may be an object that is located near a road and fixed on the ground. For example, the structure may include a streetlamp, a roadside tree, a building, an electric pole, a traffic light, a bridge and the like.

The geographical feature may include a mountain, a hill and the like.

Meanwhile, objects may be classified into a moving object and a fixed object. For example, the moving object may be a concept including another vehicle and a pedestrian. The fixed object may be a concept including a traffic signal, a road and a structure.

The object detecting apparatus 300 may include a camera 310, a radar 320, a LiDAR 330, an ultrasonic sensor 340, an infrared sensor 350 and a processor 370.

According to an embodiment, the object detecting apparatus 300 may further include other components in addition to the components described, or may not include some of the components described.

The camera 310 may be located on an appropriate portion outside the vehicle to acquire an external image of the vehicle. The camera 310 may be a mono camera, a stereo camera 310a, an around view monitoring (AVM) camera 310b or a 360-degree camera.

For example, the camera 310 may be disposed adjacent to a front windshield within the vehicle to acquire a front image of the vehicle. Or, the camera 310 may be disposed adjacent to a front bumper or a radiator grill.

For example, the camera 310 may be disposed adjacent to a rear glass within the vehicle to acquire a rear image of the vehicle. Or, the camera 310 may be disposed adjacent to a rear bumper, a trunk or a tail gate.

For example, the camera 310 may be disposed adjacent to at least one of side windows within the vehicle to acquire a side image of the vehicle. Or, the camera 310 may be disposed adjacent to a side mirror, a fender or a door.

The camera 310 may provide an acquired image to the processor 370.

The radar 320 may include electric wave transmitting and receiving portions. The radar 320 may be implemented as a pulse radar or a continuous wave radar according to a principle of emitting electric waves. The radar 320 may be implemented in a frequency modulated continuous wave (FMCW) manner or a frequency shift Keyong (FSK) manner according to a signal waveform, among the continuous wave radar methods.

The radar 320 may detect an object in a time of flight (TOF) manner or a phase-shift manner through the medium of the electric wave, and detect a position of the detected object, a distance from the detected object and a relative speed with the detected object.

The radar 320 may be disposed on an appropriate position outside the vehicle for detecting an object which is located at a front, rear or side of the vehicle.

The LiDAR 330 may include laser transmitting and receiving portions. The LiDAR 330 may be implemented in a time of flight (TOF) manner or a phase-shift manner.

The LiDAR 330 may be implemented as a drive type or a non-drive type.

For the drive type, the LiDAR 330 may be rotated by a motor and detect object near the vehicle 100.

For the non-drive type, the LiDAR 330 may detect, through light steering, objects which are located within a predetermined range based on the vehicle 100. The vehicle 100 may include a plurality of non-drive type LiDARs 330.

The LiDAR 330 may detect an object in a TOP manner or a phase-shift manner through the medium of a laser beam, and detect a position of the detected object, a distance from the detected object and a relative speed with the detected object.

The LiDAR 330 may be disposed on an appropriate position outside the vehicle for detecting an object located at the front, rear or side of the vehicle.

The ultrasonic sensor 340 may include ultrasonic wave transmitting and receiving portions. The ultrasonic sensor 340 may detect an object based on an ultrasonic wave, and detect a position of the detected object, a distance from the detected object and a relative speed with the detected object.

The ultrasonic sensor 340 may be disposed on an appropriate position outside the vehicle for detecting an object located at the front, rear or side of the vehicle.

The infrared sensor 350 may include infrared light transmitting and receiving portions. The infrared sensor 340 may detect an object based on infrared light, and detect a position of the detected object, a distance from the detected object and a relative speed with the detected object.

The infrared sensor 350 may be disposed on an appropriate position outside the vehicle for detecting an object located at the front, rear or side of the vehicle.

The processor 370 may control an overall operation of each unit of the object detecting apparatus 300.

The processor 370 may detect an object based on an acquired image, and track the object. The processor 370 may execute operations, such as a calculation of a distance from the object, a calculation of a relative speed with the object and the like, through an image processing algorithm.

The processor 370 may detect an object based on a reflected electromagnetic wave which an emitted electromagnetic wave is reflected from the object, and track the object. The processor 370 may execute operations, such as a calculation of a distance from the object, a calculation of a relative speed with the object and the like, based on the electromagnetic wave.

The processor 370 may detect an object based on a reflected laser beam which an emitted laser beam is reflected from the object, and track the object. The processor 370 may execute operations, such as a calculation of a distance from the object, a calculation of a relative speed with the object and the like, based on the laser beam.

The processor 370 may detect an object based on a reflected ultrasonic wave which an emitted ultrasonic wave is reflected from the object, and track the object. The processor 370 may execute operations, such as a calculation of a distance from the object, a calculation of a relative speed with the object and the like, based on the ultrasonic wave.

The processor may detect an object based on reflected infrared light which emitted infrared light is reflected from the object, and track the object. The processor 370 may execute operations, such as a calculation of a distance from the object, a calculation of a relative speed with the object and the like, based on the infrared light.

According to an embodiment, the object detecting apparatus 300 may include a plurality of processors 370 or may not include any processor 370. For example, each of the camera 310, the radar 320, the LiDAR 330, the ultrasonic sensor 340 and the infrared sensor 350 may include the processor in an individual manner.

When the processor 370 is not included in the object detecting apparatus 300, the object detecting apparatus 300 may operate according to the control of a processor of an apparatus within the vehicle 100 or the controller 170.

The object detecting apparatus 300 may operate according to the control of the controller 170.

The communication apparatus 400 is an apparatus for performing communication with an external device. Here, the external device may be another vehicle, a mobile terminal or a server.

The communication apparatus 400 may perform the communication by including at least one of a transmitting antenna, a receiving antenna, and radio frequency (RF) circuit and RF device for implementing various communication protocols.

The communication apparatus 400 may include a short-range communication unit 410, a location information unit 420, a V2X communication unit 430, an optical communication unit 440, a broadcast transceiver 450 and a processor 470.

According to an embodiment, the communication apparatus 400 may further include other components in addition to the components described, or may not include some of the components described.

The short-range communication unit 410 is a unit for facilitating short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like.

The short-range communication unit 410 may construct short-range area networks to perform short-range communication between the vehicle 100 and at least one external device.

The location information unit 420 is a unit for acquiring position information. For example, the location information unit 420 may include a Global Positioning System (GPS) module or a Differential Global Positioning System (DGPS) module.

The V2X communication unit 430 is a unit for performing wireless communications with a server (Vehicle to Infra; V2I), another vehicle (Vehicle to Vehicle; V2V), or a pedestrian (Vehicle to Pedestrian; V2P). The V2X communication unit 430 may include an RF circuit implementing a communication protocol with the infra (V2I), a communication protocol between the vehicles (V2V) and a communication protocol with a pedestrian (V2P).

The optical communication unit 440 is a unit for performing communication with an external device through the medium of light. The optical communication unit 440 may include a light-emitting diode for converting an electric signal into an optical signal and sending the optical signal to the exterior, and a photodiode for converting the received optical signal into an electric signal.

According to an embodiment, the light-emitting diode may be integrated with lamps provided on the vehicle 100.

The broadcast transceiver 450 is a unit for receiving a broadcast signal from an external broadcast managing entity or transmitting a broadcast signal to the broadcast managing entity via a broadcast channel. The broadcast channel may include a satellite channel, a terrestrial channel, or both. The broadcast signal may include a TV broadcast signal, a radio broadcast signal and a data broadcast signal.

The processor 470 may control an overall operation of each unit of the communication apparatus 400.

According to an embodiment, the communication apparatus 400 may include a plurality of processors 470 or may not include any processor 470.

When the processor 470 is not included in the communication apparatus 400, the communication apparatus 400 may operate according to the control of a processor of another device within the vehicle 100 or the controller 170.

Meanwhile, the communication apparatus 400 may implement a display apparatus for a vehicle together with the user interface apparatus 200. In this instance, the display apparatus for the vehicle may be referred to as a telematics apparatus or an Audio Video Navigation (AVN) apparatus.

The communication apparatus 400 may operate according to the control of the controller 170.

The driving control apparatus 500 is an apparatus for receiving a user input for driving.

In a manual mode, the vehicle 100 may be operated based on a signal provided by the driving control apparatus 500.

The driving control apparatus 500 may include a steering input device 510, an acceleration input device 530 and a brake input device 570.

The steering input device 510 may receive an input regarding a driving (ongoing) direction of the vehicle 100 from the user. The steering input device 510 is preferably configured in the form of a wheel allowing a steering input in a rotating manner. According to some embodiments, the steering input device may also be configured in a shape of a touch screen, a touchpad or a button.

The acceleration input device 530 may receive an input for accelerating the vehicle 100 from the user. The brake input device 570 may receive an input for braking the vehicle 100 from the user. Each of the acceleration input device 530 and the brake input device 570 is preferably configured in the form of a pedal. According to some embodiments, the acceleration input device or the brake input device may also be configured in a shape of a touch screen, a touchpad or a button.

The driving control apparatus 500 may operate according to the control of the controller 170.

The vehicle operating apparatus 600 is an apparatus for electrically controlling operations of various devices within the vehicle 100.

The vehicle operating apparatus 600 may include a power train operating unit 610, a chassis operating unit 620, a door/window operating unit 630, a safety apparatus operating unit 640, a lamp operating unit 650, and an air-conditioner operating unit 660.

According to some embodiments, the vehicle operating apparatus 600 may further include other components in addition to the components described, or may not include some of the components described.

Meanwhile, the vehicle operating apparatus 600 may include a processor. Each unit of the vehicle operating apparatus 600 may individually include a processor.

The power train operating unit 610 may control an operation of a power train device.

The power train operating unit 610 may include a power source operating portion 611 and a gearbox operating portion 612.

The power source operating portion 611 may perform a control for a power source of the vehicle 100.

For example, upon using a fossil fuel-based engine as the power source, the power source operating portion 611 may perform an electronic control for the engine. Accordingly, an output torque and the like of the engine can be controlled. The power source operating portion 611 may adjust the engine output torque according to the control of the controller 170.

For example, upon using an electric energy-based motor as the power source, the power source operating portion 611 may perform a control for the motor. The power source operating portion 611 may adjust a rotating speed, a torque and the like of the motor according to the control of the controller 170.

The gearbox operating portion 612 may perform a control for a gearbox.

The gearbox operating portion 612 may adjust a state of the gearbox. The gearbox operating portion 612 may change the state of the gearbox into drive (forward) (D), reverse (R), neutral (N) or parking (P).

Meanwhile, when an engine is the power source, the gearbox operating portion 612 may adjust a locked state of a gear in the drive (D) state.

The chassis operating unit 620 may control an operation of a chassis device.

The chassis operating unit 620 may include a steering operating portion 621, a brake operating portion 622 and a suspension operating portion 623.

The steering operating portion 621 may perform an electronic control for a steering apparatus within the vehicle 100. The steering operating portion 621 may change a driving direction of the vehicle.

The brake operating portion 622 may perform an electronic control for a brake apparatus within the vehicle 100. For example, the brake operating portion 622 may control an operation of brakes provided at wheels to reduce speed of the vehicle 100.

Meanwhile, the brake operating portion 622 may individually control each of a plurality of brakes. The brake operating portion 622 may differently control braking force applied to each of a plurality of wheels.

The suspension operating portion 623 may perform an electronic control for a suspension apparatus within the vehicle 100. For example, the suspension operating portion 623 may control the suspension apparatus to reduce vibration of the vehicle 100 when a bump is present on a road.

Meanwhile, the suspension operating portion 623 may individually control each of a plurality of suspensions.

The door/window operating unit 630 may perform an electronic control for a door apparatus or a window apparatus within the vehicle 100.

The door/window operating unit 630 may include a door operating portion 631 and a window operating portion 632.

The door operating portion 631 may perform the control for the door apparatus. The door operating portion 631 may control opening or closing of a plurality of doors of the vehicle 100. The door operating portion 631 may control opening or closing of a trunk or a tail gate. The door operating portion 631 may control opening or closing of a sunroof.

The window operating portion 632 may perform the electronic control for the window apparatus. The window operating portion 632 may control opening or closing of a plurality of windows of the vehicle 100.

The safety apparatus operating unit 640 may perform an electronic control for various safety apparatuses within the vehicle 100.

The safety apparatus operating unit 640 may include an airbag operating portion 641, a seatbelt operating portion 642 and a pedestrian protecting apparatus operating portion 643.

The airbag operating portion 641 may perform an electronic control for an airbag apparatus within the vehicle 100. For example, the airbag operating portion 641 may control the airbag to be deployed upon a detection of a risk.

The seatbelt operating portion 642 may perform an electronic control for a seatbelt apparatus within the vehicle 100. For example, the seatbelt operating portion 642 may control passengers to be motionlessly seated in seats 110FL, 110FR, 110RL, 110RR using seatbelts upon a detection of a risk.

The pedestrian protecting apparatus operating portion 643 may perform an electronic control for a hood lift and a pedestrian airbag. For example, the pedestrian protecting apparatus operating portion 643 may control the hood lift and the pedestrian airbag to be open up upon detecting pedestrian collision.

The lamp operating unit 650 may perform an electronic control for various lamp apparatuses within the vehicle 100.

The air-conditioner operating unit 660 may perform an electronic control for an air conditioner within the vehicle 100. For example, the air-conditioner operating unit 660 may control the air conditioner to supply cold air into the vehicle when internal temperature of the vehicle is high.

The vehicle operating apparatus 600 may include a processor. Each unit of the vehicle operating apparatus 600 may individually include a processor.

The vehicle operating apparatus 600 may operate according to the control of the controller 170.

The operation system 700 is a system that controls various driving modes of the vehicle 100. The operation system 700 may include a driving system 710, a parking exit system 740 and a parking system 750.

According to embodiments, the operation system 700 may further include other components in addition to components to be described, or may not include some of the components to be described.

Meanwhile, the operation system 700 may include a processor. Each unit of the operation system 700 may individually include a processor.

According to embodiments, the operation system may be a sub concept of the controller 170 when it is implemented in a software configuration.

Meanwhile, according to embodiment, the operation system 700 may be a concept including at least one of the user interface apparatus 200, the object detecting apparatus 300, the communication apparatus 400, the vehicle operating apparatus 600 and the controller 170.

The driving system 710 may perform driving of the vehicle 100.

The driving system 710 may receive navigation information from a navigation system 770, transmit a control signal to the vehicle operating apparatus 600, and perform driving of the vehicle 100.

The driving system 710 may receive object information from the object detecting apparatus 300, transmit a control signal to the vehicle operating apparatus 600 and perform driving of the vehicle 100.

The driving system 710 may receive a signal from an external device through the communication apparatus 400, transmit a control signal to the vehicle operating apparatus 600, and perform driving of the vehicle 100.

The parking exit system 740 may perform an exit of the vehicle 100 from a parking lot.

The parking exit system 740 may receive navigation information from the navigation system 770, transmit a control signal to the vehicle operating apparatus 600, and perform the exit of the vehicle 100 from the parking lot.

The parking exit system 740 may receive object information from the object detecting apparatus 300, transmit a control signal to the vehicle operating apparatus 600 and perform the exit of the vehicle 100 from the parking lot.

The parking exit system 740 may receive a signal from an external device through the communication apparatus 400, transmit a control signal to the vehicle operating apparatus 600, and perform the exit of the vehicle 100 from the parking lot.

The parking system 750 may perform parking of the vehicle 100.

The parking system 750 may receive navigation information from the navigation system 770, transmit a control signal to the vehicle operating apparatus 600, and park the vehicle 100.

The parking system 750 may receive object information from the object detecting apparatus 300, transmit a control signal to the vehicle operating apparatus 600 and park the vehicle 100.

The parking system 750 may receive a signal from an external device through the communication apparatus 400, transmit a control signal to the vehicle operating apparatus 600, and park the vehicle 100.

The navigation system 770 may provide navigation information. The navigation information may include at least one of map information, information regarding a set destination, path information according to the set destination, information regarding various objects on a path, lane information and current location information of the vehicle.

The navigation system 770 may include a memory and a processor. The memory may store the navigation information. The processor may control an operation of the navigation system 770.

According to embodiments, the navigation system 770 may update prestored information by receiving information from an external device through the communication apparatus 400.

According to embodiments, the navigation system 770 may be classified as a sub component of the user interface apparatus 200.

The sensing unit 120 may sense a status of the vehicle. The sensing unit 120 may include a posture sensor (e.g., a yaw sensor, a roll sensor, a pitch sensor, etc.), a collision sensor, a wheel sensor, a speed sensor, a tilt sensor, a weight-detecting sensor, a heading sensor, a gyro sensor, a position module, a vehicle forward/backward movement sensor, a battery sensor, a fuel sensor, a tire sensor, a steering sensor by a turn of a handle, a vehicle internal temperature sensor, a vehicle internal humidity sensor, an ultrasonic sensor, an illumination sensor, an accelerator position sensor, a brake pedal position sensor, and the like.

The sensing unit 120 may acquire sensing signals with respect to vehicle-related information, such as a posture, a collision, an orientation, a position (GPS information), an angle, a speed, an acceleration, a tilt, a forward/backward movement, a battery, a fuel, tires, lamps, internal temperature, internal humidity, a rotated angle of a steering wheel, external illumination, pressure applied to an accelerator, pressure applied to a brake pedal and the like.

The sensing unit 120 may further include an accelerator sensor, a pressure sensor, an engine speed sensor, an air flow sensor (AFS), an air temperature sensor (ATS), a water temperature sensor (WTS), a throttle position sensor (TPS), a TDC sensor, a crank angle sensor (CAS), and the like.

The interface unit 130 may serve as a path allowing the vehicle 100 to interface with various types of external devices connected thereto. For example, the interface unit 130 may be provided with a port connectable with a mobile terminal, and connected to the mobile terminal through the port. In this instance, the interface unit 130 may exchange data with the mobile terminal.

Meanwhile, the interface unit 130 may serve as a path for supplying electric energy to the connected mobile terminal. When the mobile terminal is electrically connected to the interface unit 130, the interface unit 130 supplies electric energy supplied from a power supply unit 190 to the mobile terminal according to the control of the controller 170.

The memory 140 is electrically connected to the controller 170. The memory 140 may store basic data for units, control data for controlling operations of units and input/output data. The memory 140 may be a variety of storage devices, such as ROM, RAM, EPROM, a flash drive, a hard drive and the like in a hardware configuration. The memory 140 may store various data for overall operations of the vehicle 100, such as programs for processing or controlling the controller 170.

According to embodiments, the memory 140 may be integrated with the controller 170 or implemented as a sub component of the controller 170.

The controller 170 may control an overall operation of each unit of the vehicle 100. The controller 170 may be referred to as an Electronic Control Unit (ECU).

The power supply unit 190 may supply power required for an operation of each component according to the control of the controller 170. Specifically, the power supply unit 190 may receive power supplied from an internal battery of the vehicle, and the like.

At least one processor and the controller 170 included in the vehicle 100 may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro controllers, microprocessors, and electric units performing other functions.

Meanwhile, the vehicle 100 according to the present disclosure may include a vehicle control device 800.

The vehicle control device 800 may control at least one of those components illustrated in FIG. 7. From this perspective, the vehicle control device 800 may be the controller 170.

Without a limit to this, the vehicle control device 800 may be a separate device, independent of the controller 170. When the vehicle control device 800 is implemented as a component independent of the controller 170, the vehicle control device 800 may be provided on a part of the vehicle 100.

Hereinafter, description will be given of an example that the vehicle control device 800 is a component separate from the controller 170 for the sake of explanation. In this specification, functions (operations) and control methods described in relation to the vehicle control device 800 may be executed by the controller 170 of the vehicle. In other words, every detail described in relation to the vehicle control device 800 may be applied to the controller 170 in the same/like manner.

Also, the vehicle control device 800 described herein may include some of the components illustrated in FIG. 7 and various components included in the vehicle. For the sake of explanation, the components illustrated in FIG. 7 and the various components included in the vehicle will be described with separate names and reference numbers.

Hereinafter, description will be given in more detail of components included in the vehicle control device 800 in accordance with one embodiment of the present disclosure, with reference to the accompanying drawings.

Hereinafter, a method of autonomously driving a vehicle associated with the present disclosure in an optimized manner or outputting a warning message associated with the driving of the vehicle in an optimized situation will be described in detail with reference to the accompanying drawings.

Figure 8:
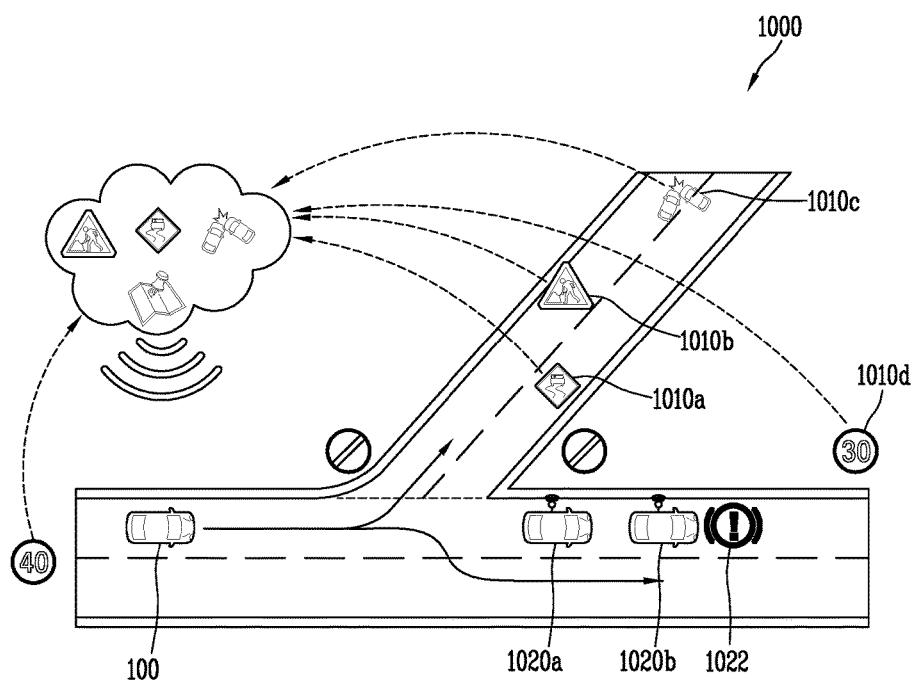
FIG. 8 is a conceptual view for explaining eHorizon associated with the present disclosure.

FIG. 8 is a conceptual view for explaining eHorizon associated with the present disclosure.

Referring to FIG. 8, the vehicle control device 800 associated with the present disclosure may autonomously drive the vehicle 100 based on eHorizon (electronic Horizon).

eHorizon may be classified into categories such as software, system, concept, and the like. eHorizon denotes a configuration in which road shape information on a detailed map in a connected environment such as an external server (cloud), V2X (Vehicle to everything) or the like and real-time events such as real-time traffic signs, road surface conditions, accidents and the like are merged to provide relevant information to autonomous driving systems and infotainment systems.

For an example, eHorizon may refer to an external server (or cloud, cloud server).

In other words, eHorizon may perform the role of transferring a detailed map road shape and real time events in front of the vehicle to autonomous driving systems and infotainment systems under an external server/V2X environment.

In order to transfer eHorizon data (information) transmitted from the eHorizon (i.e., external server) to autonomous driving systems and infotainment systems, a data specification and transmission method may be formed in accordance with a standard called "ADASIS (Advanced Driver Assistance Systems Interface Specification)."

The vehicle control device 800 associated with the present disclosure may use information received from eHorizon for autonomous driving systems and/or infotainment systems.

For example, autonomous navigation systems may be divided into safety aspects and ECO aspects.

In terms of the safety aspect, the vehicle control device 800 according to the present disclosure may perform an ADAS (Advanced Driver Assistance System) function such as LKA (Lane Keeping Assist), TJA (Traffic Jam Assist) or the like, and/or an AD (AutoDrive) function such as advance, road joining, lane change or the like using road shape information and event information received from eHorizon and surrounding object information sensed through the sensing unit 840 provided in the vehicle.

Furthermore, in terms of the ECO aspect, the vehicle control device 800 may receive inclination information, traffic light information, and the like on a front road from eHorizon to control the vehicle so as to achieve efficient engine thrust, thereby enhancing fuel efficiency.

The infotainment system may include convenience aspects.

For an example, the vehicle control device 800 may receive accident information, road surface condition information, and the like on a front road received from eHorizon to output them on a display unit (for example, HUD (Head Up Display), CID, Cluster, etc.) provided in the vehicle to provide guidance information for allowing the driver to perform safe driving.

Referring to FIG. 8, the eHorizon (external server) may receive the location information of various event information (for example, road surface state information 1010a, construction information 1010b, accident information 1010c, etc.) from the vehicle 100 generated from a road and/or road specific speed limit information 1010d from the prevent vehicle 100 or other vehicles 1020a, 1020b or collect them from an infrastructure (for example, a measuring device, a sensing device, a camera, etc.) installed on a road.

Furthermore, the event information and the road specific speed limit information may be linked to map information or may be updated.

In addition, the location information of the event information may be divided into lane units.

Using the information, the eHorizon (external server) of the present disclosure may provide information required for autonomous driving system and infotainment systems to each vehicle based on a detailed map capable of determining a road situation (or road information) in the lane unit.

In other words, the eHorizon (external server) of the present disclosure may provide an absolute highly detailed MAP using an absolute coordinate of information (for example, event information, location information of the present vehicle 100, etc.) associated with a road based on a detailed map.

The information associated with a road provided by the eHorizon may be provided only within a predetermined region (predetermined space) with respect to the vehicle 100.

Figure 9:
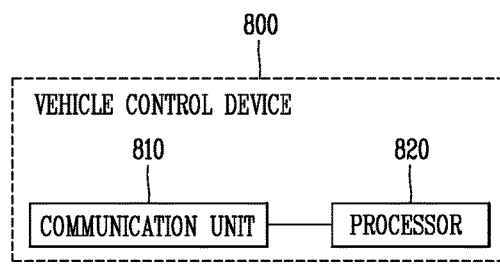
FIG. 9 is a conceptual view for explaining a vehicle control device according to an embodiment of the present disclosure.

FIG. 9 is a block diagram for explaining an embodiment of a vehicle control device according to the present disclosure.

Referring to FIG. 9, a vehicle control device 800 according to the present disclosure is a device for controlling the vehicle 100 having the sensing unit 120, and may include a communication unit 810 and a processor 820.

For an embodiment, the communication unit 810 may be the communication device 400 described above. Furthermore, the communication unit 810 may perform communication with a nearby vehicle (another vehicle) or perform communication with an external server such as an eHorizon or a cloud server.

For example, the communication unit 810 may receive a map having a plurality of layers from eHorizon. In other words, a map having a plurality of layers may include a high-precision map described in FIG. 8.

For another embodiment, the communication unit 810 may receive a layered MAP (Local Dynamic Map or ADAS MAP) transmitted from an ITS, an OEM Cloud, or a 3rd-party cloud environment.

For still another embodiment, the communication unit 810 may include a SensorIS for providing the information of the own vehicle to the OEM Cloud and the 3rd-party cloud.

SensorIS is a standard specification for transmitting sensor information (wiper, headlight, ESC operation, ABS operation, airbag, etc.) of the vehicle to the Cloud as a newly proposed sensor interface specification for autonomous driving.

It may be possible to obtain the absolute location information of a vehicle through information received by various communication methods, in particular, a high-precision map. Accordingly, accuracy may be enhanced as compared to the existing V2X communication method in which relative locations are compared while performing autonomous driving.

The processor 820 may generate a control signal for driving the vehicle using a map received through the communication unit 810. In other words, manual or autonomous driving may be carried out by a control signal generated by the processor 820.

Here, a control region that is a reference for the generation of a control signal around the location of the vehicle may defined differently according to a preset reference.

In addition, the control region may be defined by the processor 820, and the processor 820 may receive a control region defined by a preset reference from another external or internal module, device, server, or the like.

As a control region is defined, the processor 820 may use data related to the control region to generate the control signal, and may not use data not related to the control region to generate the control signal.

The vehicle may receive a lot of data for vehicle control through environments such as ITS Infra, OEM Cloud, and 3rd-party Cloud and communication environments such as DSRC, cellular, and GNSS. For example, the vehicle may receive V2X data from an infrastructure such as another vehicle, a terminal of a pedestrian, a traffic light, and the like located within a predetermined range with respect to the vehicle. In addition, as 5G networks are built in the future, more information may be transmitted more quickly.

In this case, unnecessary or redundant data for vehicle control may be received to cause problems such as insufficient memory, time delay, and cost increase. Furthermore, it may take a lot of load for the vehicle control device to process a large amount of data.

Accordingly, it may be desirable to limit a range of data used to generate a control signal to data related a control region. For example, data generated within a control region and map data corresponding to the control region may be received to generate the control signal.

In other words, a range of data used to generate the control signal may be limited to reduce memory shortage, time delay, cost increase, and the like, which may be caused by unnecessary or redundant data communication.

For example, only data required for vehicle control among data received from the foregoing various communication environments may be received and used to allow efficient and accurate autonomous driving.

On the other hand, such a control region may be defined based on at least one of a traffic of data communication amount for the control of the vehicle, speed information of the vehicle, road information on which the vehicle is driving, and a driving direction of the vehicle.

Hereinafter, an embodiment in which the control region is determined will be described in detail with reference to the drawings.

For an example, the control region may be defined as a different area according to a traffic of data communication amount for the control of the vehicle.

Figure 10:
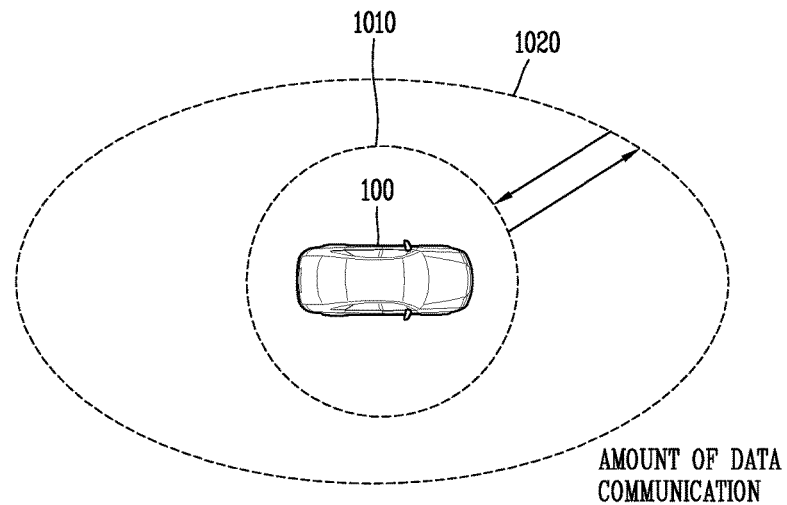
FIG. 10 is a conceptual view for explaining an embodiment in which a control region is defined according to an amount of data communication.

FIG. 10 is a conceptual view for explaining an embodiment in which a control region is defined according to an amount of data communication.

Referring to FIG. 10, a control region 1010 having a first area may be defined according to a traffic of data communication amount for the control of the vehicle 100. At this time, the control region 1010 may be defined not to generate a data missing phenomenon.

For an embodiment, when an amount of data communication decreases, a control region 1020 may be redefined to have a second area larger than the first area. Conversely, when an amount of data communication increases, the control region 1010 may be changed to have the first area again.

Referring to FIG. 10, the control region 1010, 1020 is illustrated to have a circular or elliptical shape, but the present disclosure is not limited thereto. For example, the control region may be defined in various ways such as a rectangle, a square, a shape including a vehicle route, and the like.

In other words, an area of the control region having various shapes may be increased or decreased not to generate a data loss phenomenon due to a traffic of data communication amount.

On the other hand, the control region may be defined as a different shape and area according to a speed of the vehicle.

Figure 11:
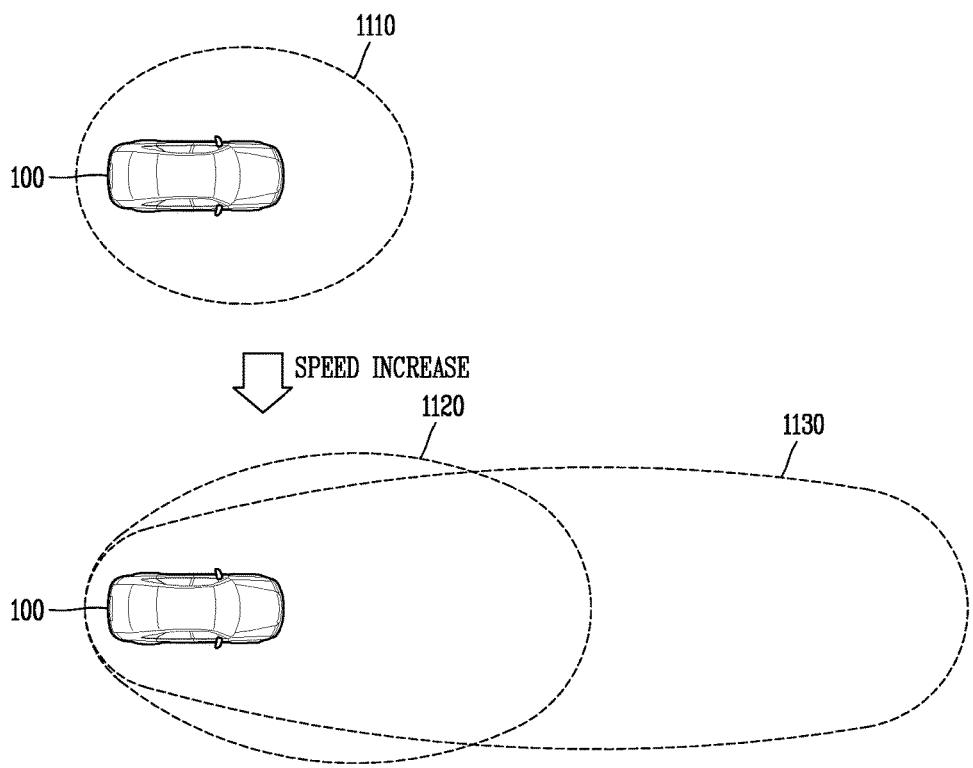
FIG. 11 is a conceptual view for explaining an embodiment in which a control region is defined according to a speed of the vehicle.

FIG. 11 is a conceptual view for explaining an embodiment in which a control region is defined according to a speed of the vehicle.

Referring to FIG. 11, when the vehicle 100 drives within a preset speed range, the control region 1110 may be defined as an elliptical shape having a slightly larger front area than a rear area thereof around the vehicle 100.

For another embodiment, when the speed of the vehicle 100 increases to drive over a preset speed range, a shape of the control region 1120 may be changed to an elliptical shape having a larger front area than a rear area thereof. At this time, an area of the control region 1120 may also be increased.

Subsequently, as the speed of the vehicle 100 gradually increases, the control region 1130 may be changed to a forwardly elongated shape with a smaller width. At this time, an area of the control region 1130 may also be increased.

In other words, according to the embodiment of FIG. 11, as the speed of the vehicle 100 increases, the control region may be defined such that data at a further distance in a forward direction can be used for vehicle control. Specifically, the control region may be changed to a forwardly elongated shape with a larger entire area and a smaller width.

Conversely, as the speed of the vehicle 100 decreases, the entire area is reduced and the control region may be changed to a shape having a slightly larger front area than a rear area thereof.

As described above, the control region may be defined differently according to a type of road on which the vehicle is driving. The road information may include a type or state of the road, and thus may include whether or not the road on which the vehicle is driving is a highway, a national road, a local road, an intersection, or the like, a pavement state of the road, a number of lanes of the road, an amount of snow piled up on the road, whether or not a specific installation or obstacle exists on the road, whether or not the road is under construction, and the like.

For an embodiment, the control region may be defined to exclude a region corresponding to a road in a driving direction opposite to that of the vehicle 100 based on the vehicle 100 driving on a preset type of road.

Figure 12:
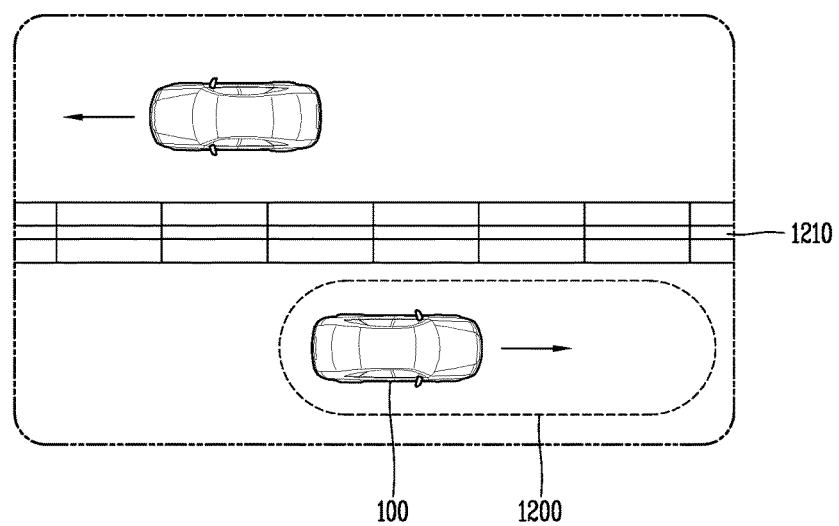
FIG. 12 is a conceptual view for explaining an embodiment in which a control region is defined according to a type of road.

FIG. 12 is a conceptual view for explaining an embodiment in which a control region is defined according to a type of road.

Referring to FIG. 12, when the vehicle 100 drives on a highway, the control region 1200 may be defined not to include a region corresponding to a road in a driving direction opposite to that of the vehicle 100.

For example, there is a very low possibility of collision with a vehicle driving on a road across the highway from a median strip 1210, and in most cases, an event such as an accident occurring on the road has a very low impact on the vehicle 100.

As a result, the control region 1200 may be defined to exclude a road region across a median strip and include a road region on which the vehicle 100 is driving. As described above, as a road region across a median strip is excluded, the road region on which the vehicle 100 is driving may be more widely included in the control region 1200.

In other words, more information substantially required for driving the vehicle may be received in consideration of the characteristics of a road.

On the other hand, the control region may be defined to exclude a region in which a possibility of collision with another vehicle is less than a preset reference based on the driving direction of the vehicle.

Figure 13:
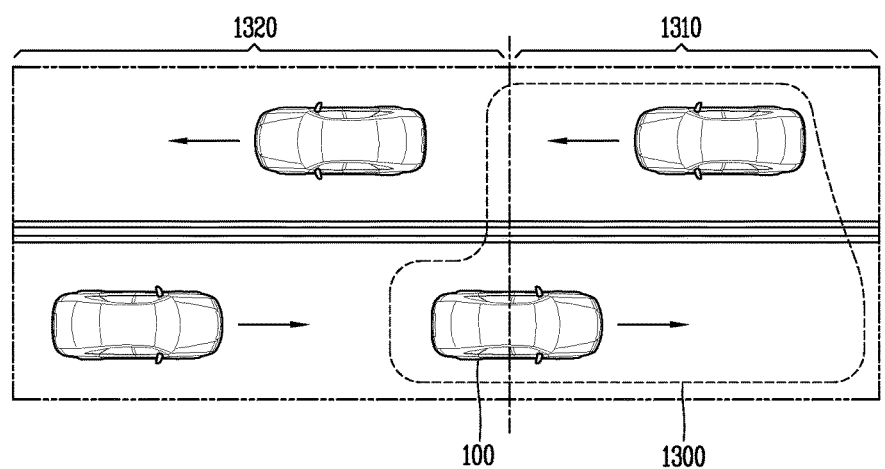
FIG. 13 is a conceptual view for explaining an embodiment in which a control region is defined according to a driving direction of the vehicle.

FIG. 13 is a conceptual view for explaining an embodiment in which a control region is defined according to a driving direction of the vehicle.

Referring to FIG. 13, a road region may be divided into a road region 1310 corresponding to a direction in which the vehicle 100 will pass and a road region 1320 corresponding to a direction in which the vehicle 100 has passed around a current location of the vehicle 100.

Here, a probability of information on the road region 1310 corresponding to a direction in which the vehicle 100 will pass is typically higher than that of information on the road region 1320 corresponding to a direction in which the vehicle 100 has passed so as to be more importantly used for the operation of the vehicle 100.

For another example, within the road region 1320 corresponding to the direction in which the vehicle 100 has passed, information on a road region (a road on which the vehicle is driving) in the same direction as a driving direction of the vehicle 100 may be used as meaningful information for the operation of the vehicle 100.

In other words, a possibility of collision with a vehicle following from behind or a vehicle traveling ahead should be generally considered while the vehicle 100 is driving.

Likewise, in case of a vehicle driving in a direction opposite to that of the vehicle 100 on an opposite lane, there is a possibility that a vehicle traveling ahead collides with the vehicle 100 around the location of the vehicle 100. However, in case of a vehicle traveling behind, it may be seen that there is almost no possibility of collision because the vehicle 100 has already passed.

As a result, the control region 1300 may be defined such that the road region 1310 corresponding to the direction in which the vehicle 100 will pass is wider than the road region 1320 corresponding to the direction in which the vehicle 100 has passed.

Furthermore, the control region 1300 may be defined such that a road region (a road on which the vehicle is driving) in the same direction as a driving direction of the vehicle 100 is partially included in the road region 1320 corresponding to the direction in which the vehicle has passed.

As described above, the control region may be defined based on one or more criteria. For example, the control region may be defined based on road information and a driving direction in which the vehicle is driving.

Figure 14:
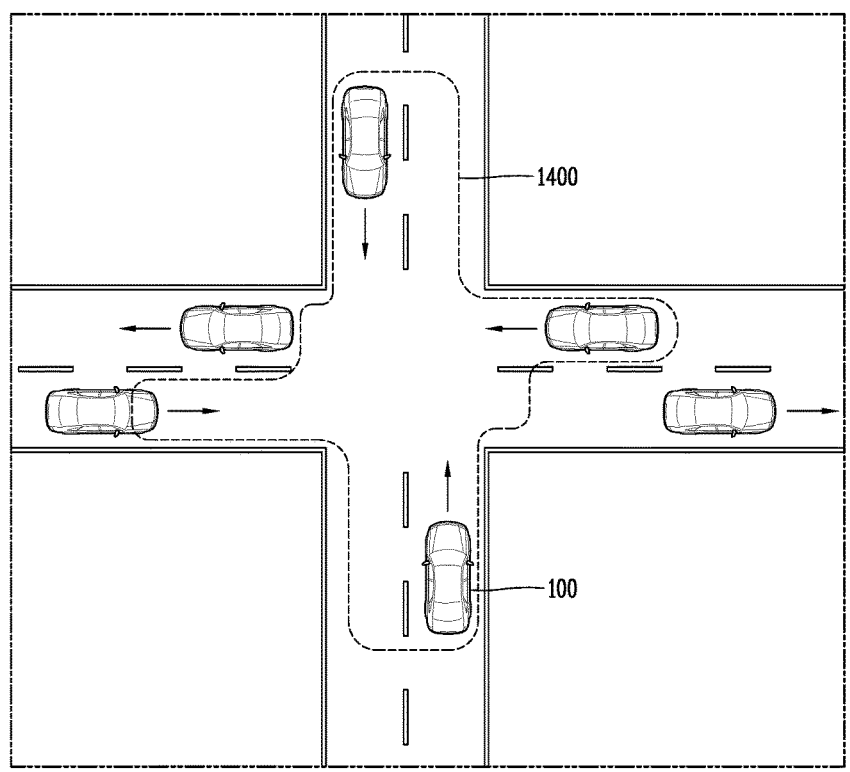
FIGS. 14 and 15 are conceptual views for explaining an embodiment in which a control region is defined differently according to a driving direction of the vehicle at an intersection.
Figure 15:
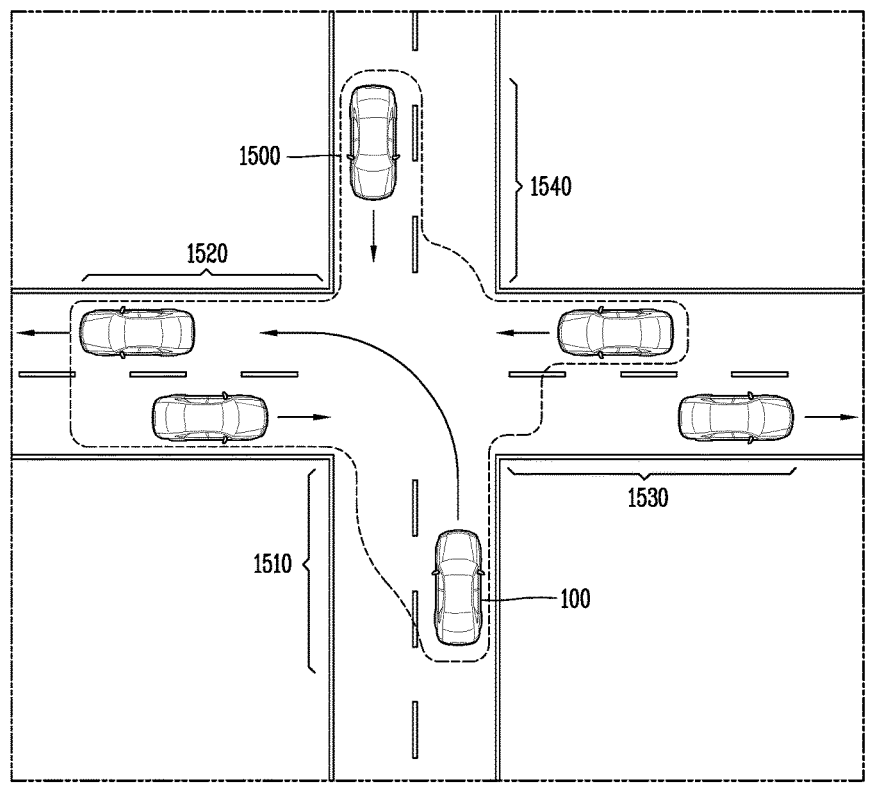

FIGS. 14 and 15 are conceptual views for explaining an embodiment in which a control region is defined differently according to a driving direction of the vehicle at an intersection.

Referring to FIG. 14, when the vehicle 100 travels straight through an intersection without changing a driving direction, information on a road region corresponding to a driving direction (traveling straight) of the vehicle 100, a road region corresponding to a direction opposite to the driving direction, and a intersection region of a road may be used as meaningful information for the operation of the vehicle 100.

For another example, within a road region intersecting perpendicular to a road on which the vehicle 100 is driving, information on a road region on which the vehicle entering an intersection region of the road is driving may be used as meaningful information for the operation of the vehicle 100. In other words, a vehicle entering an intersection region of the road will be more likely to collide with the vehicle 100.

Accordingly, a control region 1400 may include a road region corresponding to a driving direction of the vehicle 100, a road region corresponding to a direction opposite to the driving direction, and an intersection region of the road.

Furthermore, within a road region intersecting perpendicular to a road on which the vehicle 100 is driving, a road region on which the vehicle entering an intersection region of the road is driving may be further included in the control region 1400 than a road region on which the vehicle leaving the intersection region is driving.

For another embodiment, referring to FIG. 15, when the vehicle 100 makes a left turn through an intersection, information on a road region 1510 at a lower side of the intersection at which the vehicle 100 is currently driving, and a road region 1520 at a left side of the intersection at which the vehicle 100 enters through the intersection may be used as meaningful information for the operation of the vehicle 100.

For another example, within a road region 1530 at right side of the intersection, information on a road region in which the vehicle entering an intersection region is driving may be used as meaningful information for the operation of the vehicle 100.

In other words, in the road region 1530 at a right side of the intersection, the vehicle entering an intersection region of the road will be more likely to collide with the vehicle 100. On the contrary, in the road region 1530 at a right side of the intersection, the vehicle that has already passed through the intersection has little possibility of collision with the vehicle 100.

For another example, within a road region 1540 at an upper side of the intersection, information on a road region on which the vehicle entering an intersection region is driving may be used as meaningful information for the operation of the vehicle 100.

In other words, in the road region 1540 at an upper side of the intersection, the vehicle entering an intersection region of the road will be more likely to collide with the vehicle 100. On the contrary, in the road region 1540 at an upper side of the intersection, the vehicle that has already passed through the intersection has little possibility of collision with the vehicle 100.

As a result, the road region 1510 at a lower side of the intersection at which the vehicle 100 is currently driving may be further included in the control region 1500 than the road region 1520 at a left side of the intersection at which the vehicle 100 enters through the intersection.

In addition, within the road region 1530 at a right side of the intersection, a road region on which the vehicle entering an intersection region is driving may be further included in the control region 1500 than the road area on which vehicle leaving the intersection region is driving.

Likewise, among the road areas 1540 above the intersection, the road area on which the vehicle enters the intersection area may be included in the control region 1500 more than the road area on which the vehicle exiting the intersection area travels.

On the other hand, the control region may be defined as at least one of a plurality of candidate regions, and the priorities of the plurality of candidate regions may be defined based on a preset reference.

For an embodiment, the control region may be defined as a region including a driving route of the vehicle among the plurality of candidate regions.

For another embodiment, the processor 820 may control the plurality of candidate regions in different ways according to the priorities.

For still another embodiment, the processor 820 may receive map information corresponding to a control region chosen according to the priorities among the plurality of candidate regions through the communication unit 810, and then control the autonomous driving of the vehicle based on the map information.

Figure 16:
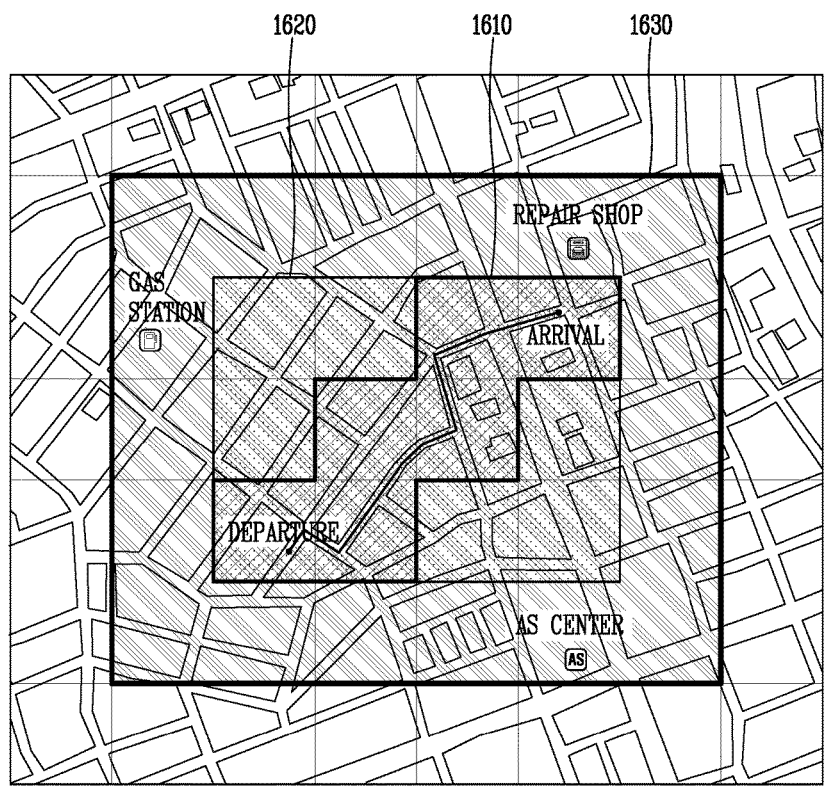
FIG. 16 is a conceptual view for explaining an embodiment of a plurality of candidate regions.

FIG. 16 is a conceptual view for explaining an embodiment of a plurality of candidate regions.

Referring to FIG. 16, map data may be divided into a plurality of tiles having a predetermined size, and each candidate region may be formed in a shape including at least one tile.

For an embodiment, the plurality of candidate regions may be a first region 1610 formed with a plurality of tiles including a driving route of the vehicle, a second region 1620 including the first region 1610 to form a rectangular shape, and a third region 1630 including the second region 1620 to include a preset specific facility.

For example, the specific facility may be a gas station, a charging station, a repair shop, an AS center, or the like. In addition, priorities may be given in the order of the first region 1610 including a driving route of the vehicle, the second region 1620, and the third region 1630.

For the related embodiment, the first region 1610 including a driving route of the vehicle may be defined as the control region. In this case, only data related to the first region 1610 may be used to generate a vehicle control signal.

For example, the processor 820 may receive map information corresponding to the first region 1610 defined as a control region through the communication unit 810, and then control the autonomous driving of the vehicle 100 based on the map information.

For another embodiment, the processor 820 may control the first region 1610, the second region 1620, and the third region 1630 having different priorities in different ways according to the priorities.

Specifically, data related to the first region 1610 may be preferentially downloaded or processed than data related to the other regions. Alternatively, data related to the first region 1610 may be replicated in a separate memory.

On the other hand, the processor 820 may receive map information corresponding to the control region through the communication unit 810, and control the autonomous driving of the vehicle 100 based on the map information.

According to an embodiment, the processor 820 may produce a plurality of events from the data of the vicinity of the vehicle 100 received through the communication unit 810, and exclude redundant events from the plurality of events based on the map information.

For another embodiment, the processor 820 may control the autonomous driving of the vehicle 100 based on an event excluding the redundant events.

For still another embodiment, the processor 820 may receive map information corresponding to a control region redefined as a region corresponding to an event excluding the redundant events through the communication unit 810, and then control the autonomous driving of the vehicle 100 based on the map information.

Figure 17:
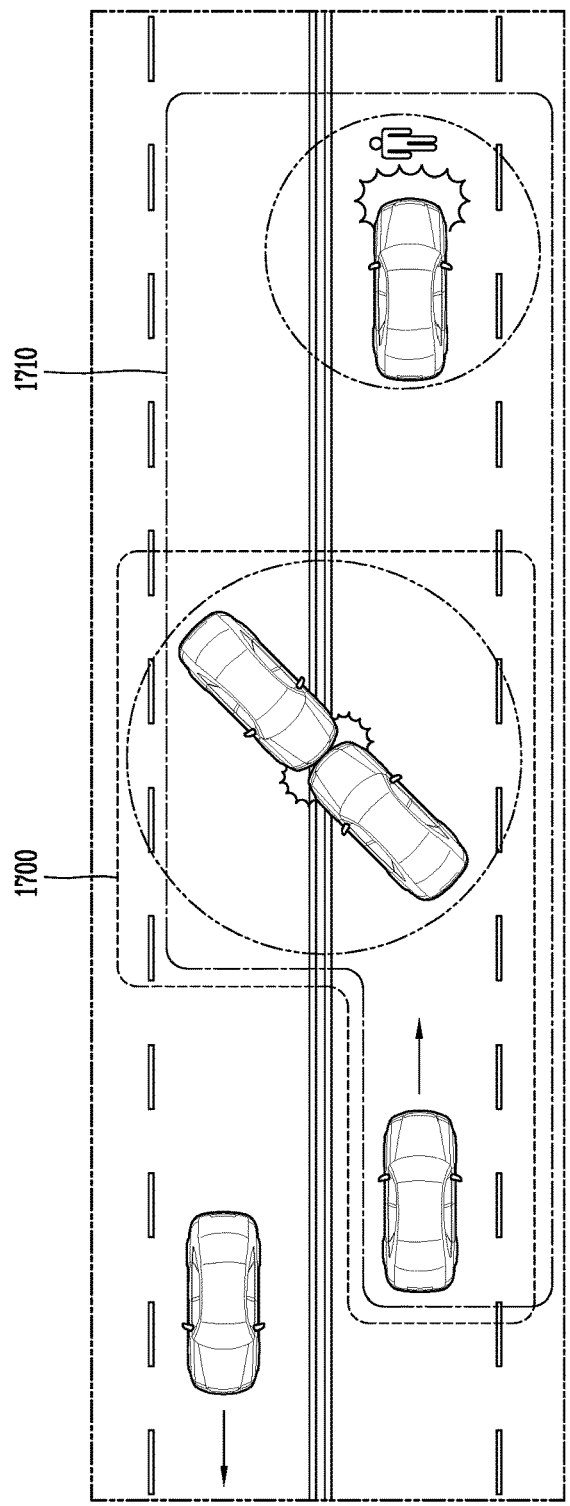
FIG. 17 is a conceptual view for explaining an embodiment for detecting redundant data.

FIG. 17 is a conceptual view for explaining an embodiment for detecting redundant data.

Referring to FIG. 17, a control region 1700 may be defined by at least one of the foregoing determination criteria of a control region.

Subsequently, the location information data of a preceding vehicle may be received by various communication modules to produce a vehicle collision event. At this time, when the relative location information of the preceding vehicle is received by a plurality of communication modules, one vehicle collision event may be produced as a plurality of different events.

In this case, according to the present disclosure, map information corresponding to a control region 1700 may be received to produce the absolute location information of the vehicle based on the map information. As a result, the produced plurality of events may be checked as one vehicle collision event. Furthermore, in this manner, the vehicle 100 may be autonomously driven.

For another embodiment, when another event is sensed following an identified vehicle collision event, whether or not the another event is an event following the vehicle collision event may be determined with reference to map information corresponding to the control region 1700.

Specifically, when another vehicle collides with a collided vehicle, it may be regarded as a subsequent event. On the contrary, another vehicle accident event occurred in a region close to the vehicle collision event, for example, an accident event in which the vehicle hits a pedestrian may be determined as a new event different from the vehicle collision event.

In other words, the vehicle control device 800 according to the present disclosure may distinguish such redundant events using the map information of the control region 1700.

For another embodiment, as the vehicle accident event is sensed as a new event, a new control region 1710 may be defined. For example, the control region 1710 may be redefined to include a region where an accident in which the vehicle hits a pedestrian has occurred.

The effects of a vehicle control device provided in a vehicle and a method for controlling the vehicle according to the present disclosure will be described as follows.

According to at least one of the embodiments of the present disclosure, the absolute location information of a vehicle may be obtained through information received by various communication methods, in particular, high-precision maps and the like. Accordingly, accuracy may be increased as compared to the existing V2X communication method in which relative locations are compared while performing autonomous driving.

In addition, a range of data used to generate a control signal may be limited to reduce memory shortage, time delay, cost increase, and the like, which may be caused by unnecessary or redundant data communication.

In other words, only data required for vehicle control among data received from various communication environments may be received and used to allow efficient and accurate autonomous driving.

In addition, according to at least one of the embodiments of the present disclosure, a data loss phenomenon due to a traffic of data communication amount may not occur due to control regions having various shapes and areas.

Furthermore, more information substantially required for driving the vehicle may be received in consideration of the characteristics of a road, and redundant events may be distinguished using map information.

For another example, stability may be enhanced through replicating map data required for autonomous driving.

The foregoing present disclosure may be implemented as codes readable by a computer on a medium written by the program. The computer-readable media may include all kinds of recording devices in which data readable by a computer system is stored. Examples of the computer-readable media may include ROM, RAM, CD-ROM, magnetic tape, floppy disk, and optical data storage device, and the like, and also include a device implemented in the form of a carrier wave (for example, transmission via the Internet). In addition, the computer may include a processor or controller. Accordingly, the detailed description thereof should not be construed as restrictive in all aspects but considered as illustrative. The scope of the invention should be determined by reasonable interpretation of the appended claims and all changes that come within the equivalent scope of the invention are included in the scope of the invention.

What is claimed is:

1. A vehicle control device for a vehicle, the vehicle control device comprising:
   a vehicle communication apparatus disposed in the vehicle and configured to obtain, from a server, a map having a plurality of layers;
   one or more processors; and
   a non-transitory computer-readable medium coupled to the one or more processors having stored thereon instructions which, when executed by the one or more processors, causes the one or more processors to perform operations comprising:
      obtaining, through the vehicle communication apparatus, the map having the plurality of layers;
      defining a control region around a location of the vehicle;
      modifying the control region according to one or more preset criteria; and
      generating a control signal for driving of the vehicle based on data associated with a portion of the obtained map corresponding to the control region,
   wherein modifying the control region comprises:
      searching for a plurality of lanes of a road on which the vehicle is driven,
      selecting one or more lanes among the plurality of lanes based on the preset criteria, and
      modifying the control region to include the selected one or more lanes and to exclude one or more unselected lanes among the plurality of lanes.

2. The vehicle control device of claim 1, wherein the control region has an elliptical shape, and
   wherein the control region is positioned around the location of the vehicle such that a first area of the control region located in front of the vehicle is greater than a second area of the control region located behind the vehicle.

3. The vehicle control device of claim 2, wherein the operations comprise:
   determining at least one of an amount of communicated data associated with controlling of the vehicle, speed information of the vehicle, road information corresponding to the location of the vehicle, or a driving direction of the vehicle, and
   wherein modifying of the control region comprises modifying the control region based on at least one of the determined amount of communicated data associated with controlling of the vehicle, speed information of the vehicle, road information corresponding to the location of the vehicle, or driving direction of the vehicle.

4. The vehicle control device of claim 3, wherein the amount of communicated data associated with controlling of the vehicle has been determined, and
   wherein the modifying of the control region comprises enlarging or reducing an area of the control region based on the amount of communicated data associated with controlling of the vehicle.

5. The vehicle control device of claim 3, wherein the speed information of the vehicle has been determined, and wherein the modifying of the control region comprises modifying a shape and an area of the control region based on the speed information of the vehicle.

6. The vehicle control device of claim 3, wherein the road information corresponding to the location of the vehicle has been determined, and
   wherein the modifying of the control region comprises modifying the control region based on a type of a road corresponding to the location of the vehicle.

7. The vehicle control device of claim 6, wherein the modifying of the control region comprises:
   determining that the road corresponding to the location of the vehicle is a preset type of road; and
   based on the determination that the road corresponding to the location of the vehicle is the preset type of road, excluding, from the control region, a first region corresponding to an opposite driving lane of the road.

8. The vehicle control device of claim 3, wherein the modifying of the control region comprises:
   determining that a possibility of collision with another vehicle within a second region is less than a preset value based on a driving direction of the vehicle; and
   based on the determination that the possibility of collision with another vehicle within the second region is less than the preset value, excluding the second region from the control region.

9. The vehicle control device of claim 3, wherein the operations comprise:
   defining a plurality of candidate regions; and
   setting the control region to be one of the plurality of candidate regions.

10. The vehicle control device of claim 9, wherein the plurality of candidate regions have respective priorities defined based on the preset criteria.

11. The vehicle control device of claim 10, wherein each of the plurality of candidate regions comprises a plurality of tiles, each of the plurality of tiles having a predetermined size, and
    wherein one of the plurality of candidate regions comprises tiles that include at least a portion of a driving route of the vehicle.

12. The vehicle control device of claim 10, wherein the operations comprise:
    prioritizing obtaining or processing of data associated with the plurality of candidate regions based on respective priorities of the plurality of candidate regions.

13. The vehicle control device of claim 10, wherein the operations comprise:
    replicating, to a memory, data associated with the plurality of candidate regions based on respective priorities of the plurality of candidate regions.

14. The vehicle control device of claim 3, wherein the operations comprise:
    autonomously driving the vehicle based on the control signal.

15. The vehicle control device of claim 14, wherein the operations comprise:
    obtaining, through the vehicle communication apparatus, driving-related data associated with a vicinity of the vehicle;
    generating a plurality of events based on the obtained driving-related data associated with the vicinity of the vehicle; and
    generating a plurality of non-redundant events by excluding redundant events from the plurality of events based on the obtained map.

16. The vehicle control device of claim 15, wherein the operations comprise:
    generating the control signal for driving of the vehicle based on the plurality of non-redundant events.

17. The vehicle control device of claim 15, wherein the modifying of the control region comprises adding, to the control region, regions corresponding to the plurality of non-redundant events.

18. A method of controlling a vehicle that includes a vehicle communication apparatus disposed in the vehicle and one or more processors configured to control the vehicle, the method comprising:

obtaining, from a server through the vehicle communication apparatus, a map having a plurality of layers;

defining a control region around a location of the vehicle;

modifying the control region according to one or more preset criteria; and generating a control signal for driving of the vehicle based on data associated with a portion of the obtained map corresponding to the control region, wherein modifying the control region comprises:

searching for a plurality of lanes of a road on which the vehicle is driven, selecting one or more lanes among the plurality of lanes based on the preset criteria, and modifying the control region to include the one or more lanes selected among the plurality of lanes and to exclude one or more unselected lanes among the plurality of lanes.

19. The method of claim 18, wherein the generating of the control signal comprises:

excluding data not associated with the portion of the obtained map corresponding to the control region for generating the control signal.

20. The method of claim 19, comprising:

determining at least one of an amount of communicated data associated with controlling of the vehicle, speed information of the vehicle, road information corresponding to the location of the vehicle, or a driving direction of the vehicle, wherein the modifying of the control region comprises modifying the control region based on at least one of the determined amount of communicated data associated with controlling of the vehicle, speed information of the vehicle, road information corresponding to the location of the vehicle, or driving direction of the vehicle.

\* \* \* \* \*